＝US011268264B2

(12) United States Patent
Ishibashi et al.

(10) Patent No.: US 11,268,264 B2
(45) Date of Patent: Mar. 8, 2022

(54) CONTROL SYSTEM FOR WORK VEHICLE, CONTROL METHOD, AND WORK VEHICLE

(71) Applicant: KOMATSU LTD., Tokyo (JP)

(72) Inventors: Eiji Ishibashi, Tokyo (JP); Takahiro Shimojo, Tokyo (JP); Akifumi Inamaru, Tokyo (JP); Toshihiro Kawano, Tokyo (JP); Yasuhito Yonezawa, Tokyo (JP); Yosuke Kogawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 190 days.

(21) Appl. No.: 16/330,971

(22) PCT Filed: Oct. 25, 2017

(86) PCT No.: PCT/JP2017/038421
§ 371 (c)(1),
(2) Date: Mar. 6, 2019

(87) PCT Pub. No.: WO2018/084030
PCT Pub. Date: May 11, 2018

(65) Prior Publication Data
US 2019/0194912 A1 Jun. 27, 2019

(30) Foreign Application Priority Data
Nov. 1, 2016 (JP) .............................. JP2016-214482

(51) Int. Cl.
E02F 9/26 (2006.01)
E02F 3/76 (2006.01)
(Continued)

(52) U.S. Cl.
CPC ............ E02F 9/262 (2013.01); E02F 3/7609 (2013.01); E02F 3/84 (2013.01); E02F 3/844 (2013.01); E02F 9/20 (2013.01)

(58) Field of Classification Search
CPC ..... E02F 9/262; E02F 3/84; E02F 9/20; E02F 3/7609; E02F 3/844; E02F 3/841;
(Continued)

(56) References Cited

U.S. PATENT DOCUMENTS 5,621,643 A 4/1997 Nakagami et al.
6,181,999 B1 1/2001 Yamamoto et al.
(Continued)

FOREIGN PATENT DOCUMENTS

CN 104074213 A 10/2014
CN 205530437 U 8/2016
(Continued)

OTHER PUBLICATIONS

English_Translation_JP2014084683A (Year: 2014).*
(Continued)

Primary Examiner — Peter D Nolan
Assistant Examiner — Ashley L Redhead, Jr.
(74) Attorney, Agent, or Firm — Global IP Counselors, LLP

(57) ABSTRACT

A control system for a work vehicle includes a controller. The controller receives actual topography information of a work target. The controller determines a design surface that is positioned below the actual topography. The controller generates a command signal to move the work implement along the design surface. The controller determines if slip of the work vehicle has occurred. The controller raises the design surface when the blade tip of the work implement is positioned below an initial target surface when the slip occurs. The initial target surface is the design surface before the occurrence of the slip.

20 Claims, 19 Drawing Sheets

(51) Int. Cl.
*E02F 3/84* (2006.01)
*E02F 9/20* (2006.01)

(58) Field of Classification Search
CPC .. E02F 3/76; E02F 9/205; E02F 3/845; G05D 2201/0202; G05D 1/0274; G05D 1/0278
See application file for complete search history.

(56) References Cited

U.S. PATENT DOCUMENTS

| | | | |
|---|---|---|---|
| 2008/0127530 A1* | 6/2008 | Kelly | E02F 3/847 37/403 |
| 2011/0153170 A1 | 6/2011 | Dishman et al. | |
| 2015/0019086 A1 | 1/2015 | Hayashi et al. | |
| 2016/0069042 A1 | 3/2016 | Wei et al. | |
| 2016/0343095 A1* | 11/2016 | Wei | G06Q 10/06398 |

FOREIGN PATENT DOCUMENTS

| | | |
|---|---|---|
| JP | 60-112936 A | 6/1985 |
| JP | 5-106239 A | 4/1993 |
| JP | 10-88612 A | 4/1998 |
| JP | 2013-515885 A | 5/2013 |
| JP | 2014-84683 A | 5/2014 |
| JP | 2014084683 A * | 5/2014 .............. E02F 3/844 |

OTHER PUBLICATIONS

The Office Action for the corresponding Japanese application No. 2016-214482, dated Aug. 4, 2020.

The Office Action for the corresponding Chinese application No. 201780051752.2, dated Sep. 2, 2020.

The International Search Report for the corresponding international application No. PCT/JP2017/038421, dated Jan. 9, 2018.

* cited by examiner

CONTROL SYSTEM FOR WORK VEHICLE, CONTROL METHOD, AND WORK VEHICLE

CROSS-REFERENCE TO RELATED APPLICATIONS

This application is a U.S. National stage application of International Application No. PCT/JP2017/038421, filed on Oct. 25, 2017. This U.S. National stage application claims priority under 35 U.S.C. § 119(a) to Japanese Patent Application No. 2016-214482, filed in Japan on Nov. 1, 2016, the entire contents of which are hereby incorporated herein by reference.

BACKGROUND

Field of the Invention

The present invention relates to a control system for a work vehicle, a control method, and a work vehicle.

Background Information

Techniques for automatically controlling the position of a blade have been conventionally proposed for work vehicles such as bulldozers and motor graders. For example, in Japanese Laid-Open Patent Publication No. H05-106239, the vertical position of the blade is controlled automatically by a controller so as to maintain the load applied to the blade during excavation at a target value.

Specifically, the work vehicle in Japanese Laid-Open Patent Publication No. H05-106239 is equipped with a straight frame for supporting the blade and a lift cylinder connected to the straight frame. The controller obtains the relative angle of the straight frame with respect to the vehicle body from the stroke amount of the lift cylinder and controls the vertical position of the blade on the basis of the relative angle.

In addition, when shoe slip occurs in the work vehicle during excavation, the controller raises the blade. As a result, the load on the blade is reduced and the shoe slip can be avoided.

SUMMARY

In the abovementioned work vehicle, the vertical position of the blade is controlled in accordance with the relative angle of the straight frame with respect to the vehicle body. Therefore, when slip occurs, the blade is controlled so as to rise with respect to the vehicle body. In this case, the following problem may occur.

FIGS. 20A-20C are schematic views of a state in which slip occurs on a work vehicle 100 during excavation. As illustrated in FIG. 20A, slip occurs on the work vehicle 100 due to the load on the work implement 200 that is plunged into the soil becoming too large. In this state, the blade tip of the work implement 200 is not able to move from the position P1 and the front part of the work vehicle 100 rises upward from the ground surface G.

Under these conditions, the controller detects the occurrence of slip and raises the work implement 200. At this time, the work implement 200 is controlled so as to rise with respect to the vehicle body of the work vehicle 100. Consequently, as illustrated in FIG. 20B, the relative angle of the work implement 200 with respect to the vehicle body is changed, but the blade tip of the work implement 200 remains at the position P1. The relative angle of the work implement 200 with respect to the vehicle body is changed further and, as illustrated in FIG. 20C, the front part of the work vehicle 100 comes into contact with the ground. As a result, there is a problem that the emergence from the slip is delayed because a long period of time is taken for the front part of the work vehicle 100 to come into contact with the ground.

In addition, as illustrated in FIG. 20C, even if the work vehicle 100 emerges from the slip, the blade tip of the work implement 200 is positioned at the same position P1 when the slip occurred. As a result, there is a problem that the slip will occur again and the occurrence of slip will be repeated.

An object of the present invention is to promptly allow the work vehicle to emerge from slip during excavation and limit the repetition of the slip.

A control system according to a first aspect is a control system for a work vehicle including a work implement, the control system comprising a controller. The controller is programmed so as to execute the following processing. The controller receives actual topography information which indicates an actual topography of a work target. The controller determines a design surface that is positioned below the actual topography. The controller generates a command signal for moving the work implement along the design surface. The controller determines that slip has occurred with the work vehicle. The controller raises the design surface when the blade tip of the work implement is positioned below an initial target surface when the slip occurs. The initial target surface is the design surface before the occurrence of the slip.

A control method according to a second aspect is a control method for a work vehicle including a work implement, the method comprising the following processes. A first process is receiving actual topography information which indicates an actual topography of a work target. A second process is determining a design surface that is positioned below the actual topography. A third process is generating a command signal for moving the work implement along the design surface. A fourth process is determining the occurrence of slip with the work vehicle. A fifth process is raising the design surface when the blade tip of the work implement is positioned below an initial target surface when the slip occurs. The initial target surface is the design surface before the occurrence of the slip.

A work vehicle according to a third aspect comprises a work implement and a controller. The controller moves the work implement along a design surface that is positioned blow an actual topography of a work target. The controller raises the design surface when the blade tip of the work implement is positioned below an initial target surface when slip occurs with the work vehicle. The initial target surface is the design surface before the occurrence of the slip.

In the present invention, the design surface is raised when the blade tip of the work implement is positioned below the initial target surface when the slip occurs with the work vehicle. The work implement is then controlled so as to move along the changed design surface. Therefore, the blade tip of the work implement can be moved with respect to the actual topography. As a result, the front part of the work vehicle can be made to come into contact with the ground surface more quickly than in comparison to a case in which the relative position of the blade tip of the work implement is changed with respect to the vehicle. As a result, the work vehicle can emerge from slip more quickly. In addition, because the blade tip position of the work implement is changed from the position when the slip occurred, the repetition of the slip can be limited.

DETAILED DESCRIPTION OF EMBODIMENT(S)

Figure 1:
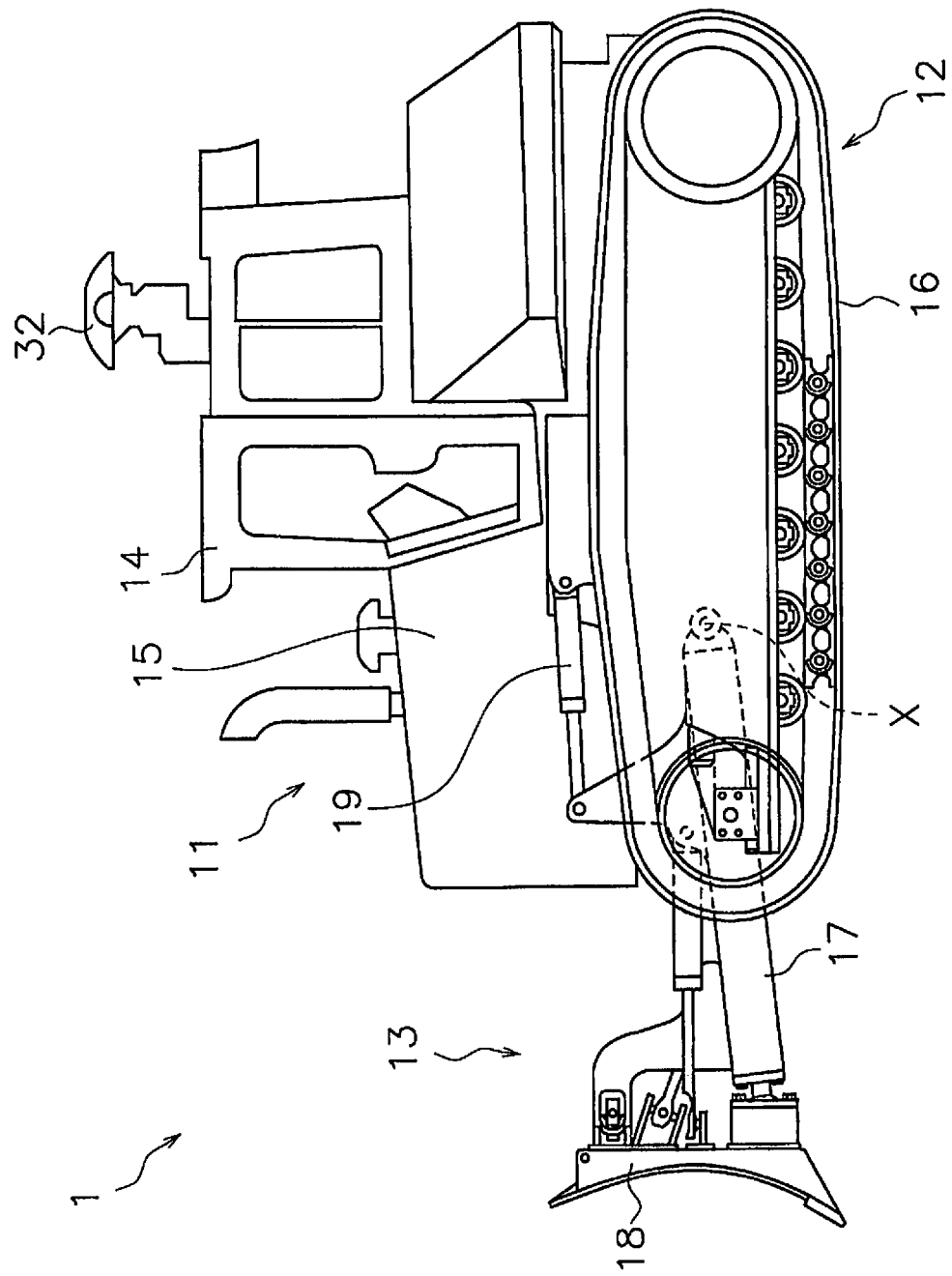
FIG. 1 is a side view of a work vehicle according to an embodiment.

A work vehicle according to an embodiment is discussed hereinbelow in detail with reference to the drawings. FIG. 1 is a side view of the work vehicle 1 according to an embodiment. The work vehicle 1 according to the present embodiment is a bulldozer. The work vehicle 1 includes a vehicle body 11, a travel device 12, and a work implement 13.

The vehicle body 11 has an operating cabin 14 and an engine room 15. An operator's seat that is not illustrated is disposed inside the operating cabin 14. The engine room 15 is disposed in front of the operating cabin 14. The travel device 12 is attached to a bottom part of the vehicle body 11. The travel device 12 has a pair of left and right crawler belts 16. Only the right crawler belt 16 is illustrated in FIG. 1. The work vehicle 1 travels due to the rotation of the crawler belts 16.

The work implement 13 is attached to the vehicle body 11. The work implement 13 has a lift frame 17, a blade 18, and a lift cylinder 19. The lift frame 17 is attached to the vehicle body 11 in a manner that allows movement up and down centered on an axis X that extends in the vehicle width direction. The lift frame 17 supports the blade 18.

The blade 18 is disposed in front of the vehicle body 11. The blade 18 moves up and down accompanying the up and down motions of the lift frame 17. The lift cylinder 19 is coupled to the vehicle body 11 and the lift frame 17. Due to the extension and contraction of the lift cylinder 19, the lift frame 17 rotates up and down centered on the axis X.

Figure 2:
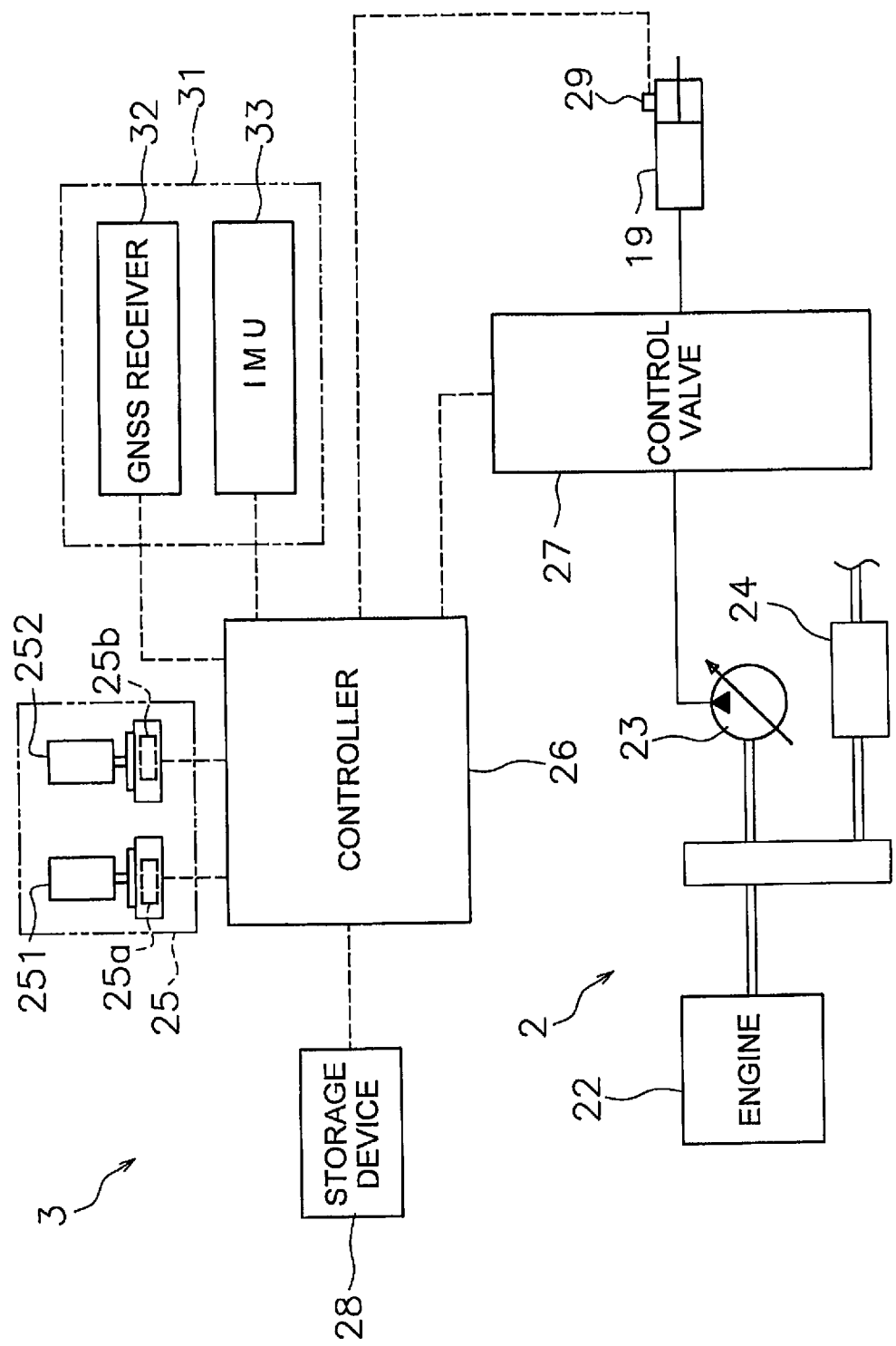
FIG. 2 is a block diagram illustrating a configuration of a drive system and a control system of the work vehicle.

FIG. 2 is a block diagram illustrating a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge operating fluid. The operating fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST), for example. Alternatively, the power transmission device 24, for example, may be a transmission including a torque converter or a plurality of speed change gears.

The control system 3 includes an operating device 25, a controller 26, and a control valve 27. The operating device 25 is a device for operating the work implement 13 and the travel device 12. The operating device 25 is disposed in the operating cabin 4. The operating device 25 includes, for example, an operating lever, a pedal, and a switch and the like.

The operating device 25 includes an operating device 251 for the travel device 12 and an operating device 252 for the work implement 13. The operating device 251 for the travel device 12 is provided so as to allow operation between a forward movement position, a reverse movement position, and a neutral position. The travel device 12 or the power transmission device 24 is controlled so that the work vehicle 1 moves forward when the operating position of the operating device 251 for the travel device 12 is the forward movement position. The travel device 12 or the power transmission device 24 is controlled so that the work vehicle 1 moves in reverse when the operating position of the operating device 251 for the travel device 12 is the reverse movement position.

The operating device 252 for the work implement 13 is provided so as to allow operation of the motions of the lift cylinder 19. By operating the operating device 252 for the work implement 13, the lift operation of the blade 18 can be performed.

The operating device 25 includes sensors 25a and 25b for detecting the operations of the operating device 25 by the operator. The operating device 25 accepts operations from the operator for driving the work implement 13 and the travel device 12, and outputs operation signals corresponding to the operations. The sensor 25a outputs the operation signals corresponding to the operations of the operating device 251 for the travel device 12. The sensor 25b outputs the operation signals corresponding to the operations of the operating device 252 for the work implement 13.

The controller 26 is programmed to control the work vehicle 1 on the basis of obtained information. The controller 26 includes, for example, a processing device such as a CPU. The controller 26 obtains operation signals from the sensors 25a and 25b of the operating device 25. The controller 26 controls the control valve 27 on the basis of the operation signals. The controller 26 is not limited to one component and may be divided into a plurality of controllers.

The control valve 27 is a proportional control valve and is controlled by command signals from the controller 26. The control valve 27 is disposed between the hydraulic pump 23 and hydraulic actuators such as the lift cylinder 19. The control valve 27 controls the flow rate of the operating fluid supplied from the hydraulic pump 23 to the lift cylinder 19. The controller 26 generates a command signal to the control valve 27 so that the work implement 13 acts in accordance with the abovementioned operations of the operating device 252. As a result, the lift cylinder 19 is controlled in response to the operation amount of the operating device 252. The control valve 27 may be a pressure proportional control valve. Alternatively, the control valve 27 may be an electromagnetic proportional control valve.

Figure 3:
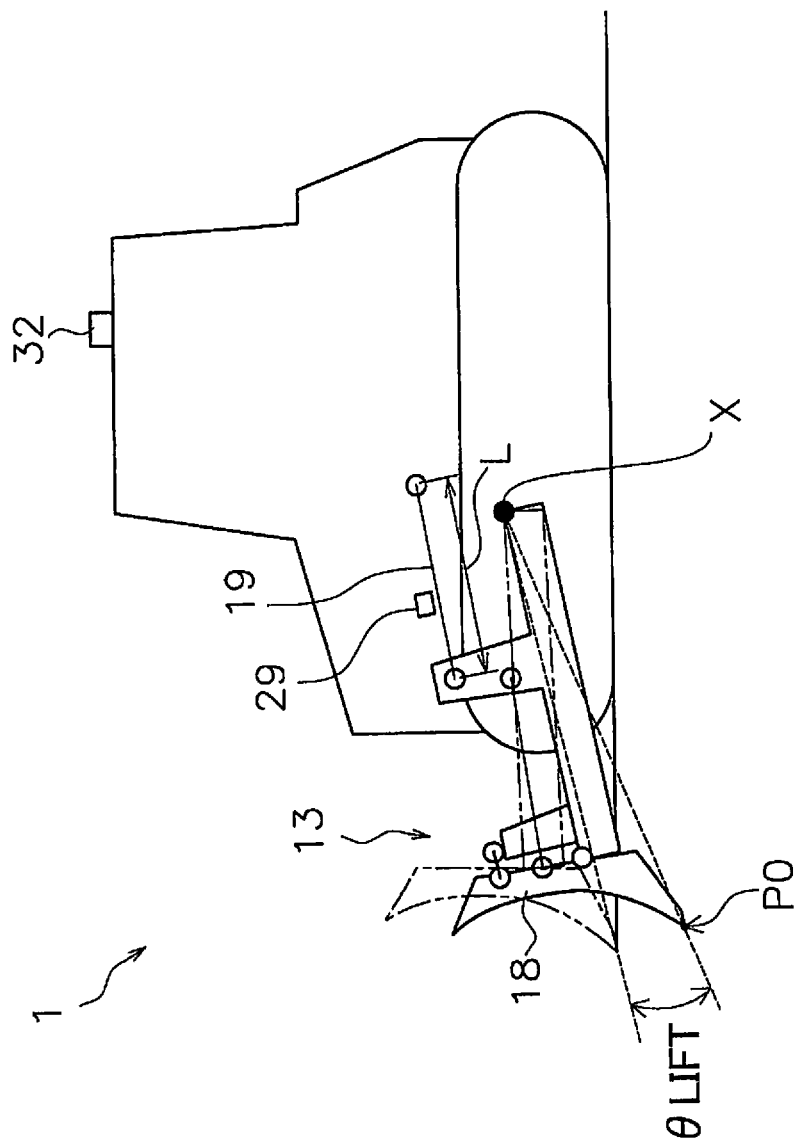
FIG. 3 is a schematic view of a configuration of the work vehicle.

The control system 3 includes a lift cylinder sensor 29. The lift cylinder sensor 29 detects the stroke length (referred to below as "lift cylinder length L") of the lift cylinder 19. As depicted in FIG. 3, the controller 26 calculates a lift angle θlift of the blade 18 on the basis of the lift cylinder length L. FIG. 3 is a schematic view of a configuration of the work vehicle 1.

The origin position of the work implement 13 is depicted as a chain double-dashed line in FIG. 3. The origin position of the work implement 13 is the position of the blade 18 while the blade tip of the blade 18 is in contact with the ground surface on a horizontal ground surface. The lift angle θlift is the angle from the origin position of the work implement 13.

As illustrated in FIG. 2, the control system 3 includes a position detection device 31. The position detection device 31 detects the position of the work vehicle 1. The position detection device 31 includes a GNSS receiver 32 and an IMU 33. The GNSS receiver 32 is disposed on the operating cabin 14. The GNSS receiver 32 is, for example, an antenna for a global positioning system (GPS). The GNSS receiver 32 receives vehicle body position information which indicates the position of the work vehicle 1. The controller 26 obtains the vehicle body position information from the GNSS receiver 32.

The IMU 33 is an inertial measurement device. The IMU 33 obtains vehicle body inclination angle information. The vehicle body inclination angle information includes the angle (pitch angle) relative to horizontal in the vehicle front-back direction and the angle (roll angle) relative to horizontal in the vehicle lateral direction. The IMU 33 transmits the vehicle body inclination angle information to the controller 26. The controller 26 obtains the vehicle body inclination angle information from the IMU 33.

The controller 26 computes a blade tip position P0 from the lift cylinder length L, the vehicle body position information, and the vehicle body inclination angle information. As illustrated in FIG. 3, the controller 26 calculates global coordinates of the GNSS receiver 32 on the basis of the vehicle body position information. The controller 26 calculates the lift angle θlift on the basis of the lift cylinder length L. The controller 26 calculates local coordinates of the blade tip position P0 with respect to the GNSS receiver 32 on the basis of the lift angle θlift and vehicle body dimension information. The vehicle body dimension information is stored in a storage device 28 and indicates the position of the work implement 13 with respect to the GNSS receiver 32. The controller 26 calculates the global coordinates of the blade tip position P0 on the basis of the global coordinates of the GNSS receiver 32, the local coordinates of the blade tip position P0, and the vehicle body inclination angle information. The controller 26 obtains the global coordinates of the blade tip position P0 as blade tip position information.

The control system 3 includes the storage device 28. The storage device 28 includes, for example, a memory and an auxiliary storage device. The storage device 28 may be a RAM or a ROM, for example. The storage device 28 may be a semiconductor memory or a hard disk or the like. The controller 26 communicates by wire or wirelessly with the storage device 28, thereby obtaining the information stored in the storage device 28.

The storage device 28 stores the blade tip position information, actual topography information, and design topography information. The design topography information indicates the position and the shape of a final design topography. The final topography is the final target topography of a work target at a work site. The controller 26 obtains the actual topography information. The actual topography information indicates the position and shape of the actual topography of the work target at the work site. The controller 26 automatically controls the work implement 13 on the basis of the actual topography information, the design topography information, and the blade tip position information.

The automatic control of the work implement 13 may be a semi-automatic control that is performed in accompaniment with manual operations by an operator. Alternatively, the automatic control of the work implement 13 may be a fully automatic control that is performed without manual operations by an operator.

Figure 4:
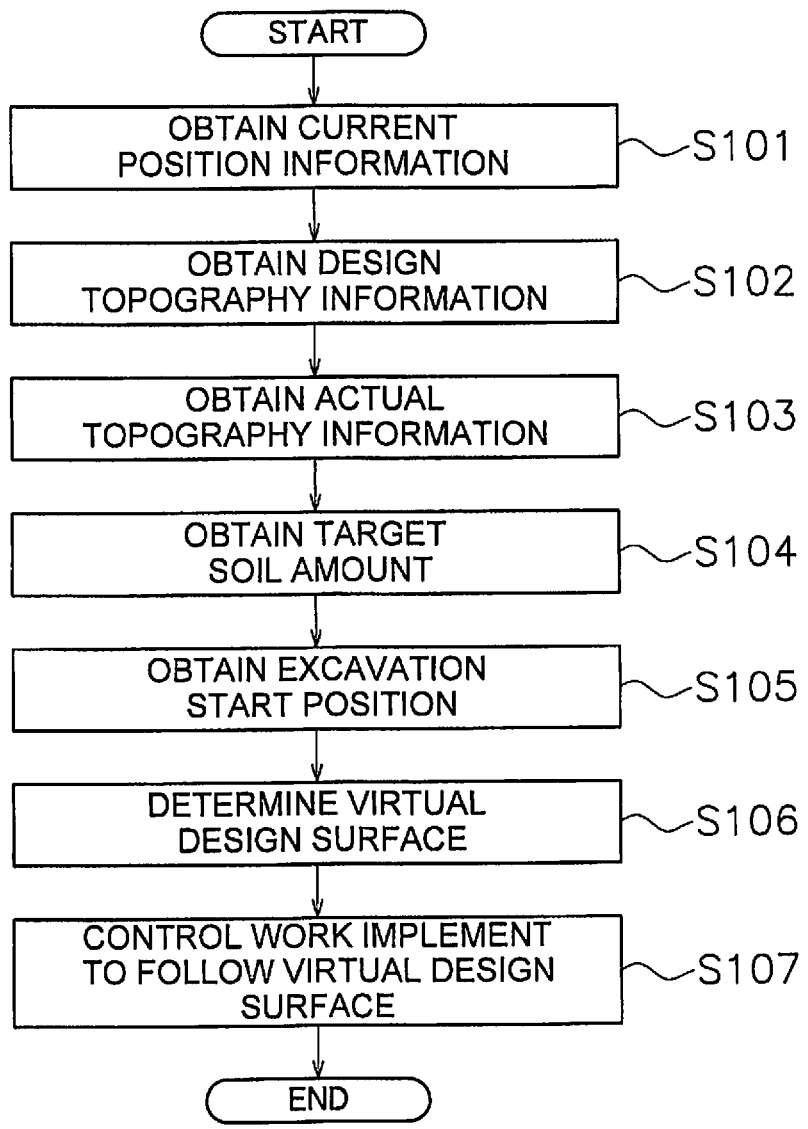
FIG. 4 is a flow chart illustrating automatic control processing of the work implement during excavation work.

Automatic control of the work implement 13 during excavation work and executed by the controller 26 will be explained below. FIG. 4 is a flow chart illustrating automatic control processing of the work implement 13 during excavation work.

As illustrated in FIG. 4, the controller 26 obtains current position information in step S101. The controller 26 obtains the current blade tip position P0 of the work implement 13 at this time.

Figure 5:
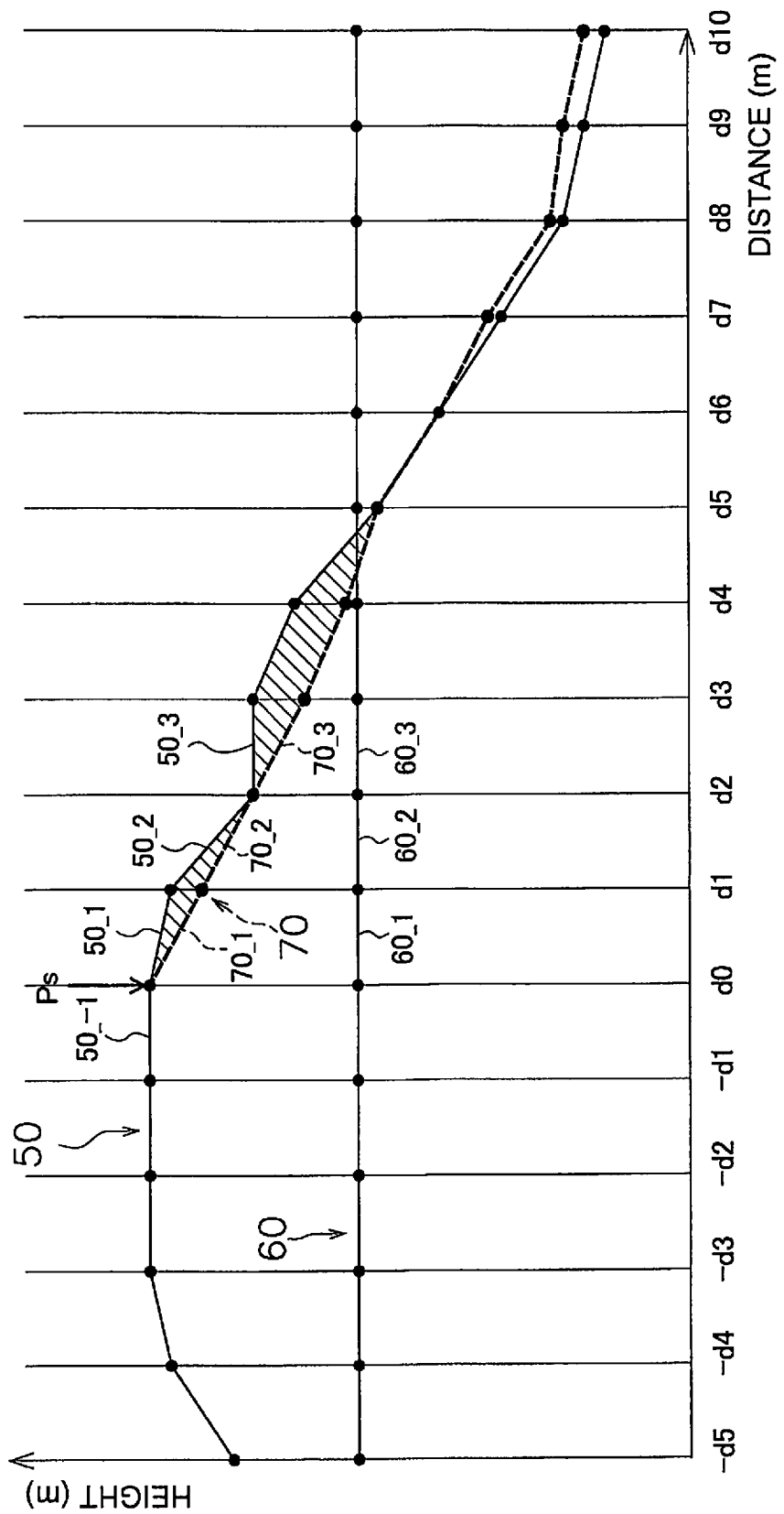
FIG. 5 illustrates examples of a final design topography, an actual topography, and a virtual design surface.

In step S102, the controller 26 obtains the design topography information. As illustrated in FIG. 5, the design topography information includes the height of the final design topography 60 at a plurality of points (see "−d5" to "d10" in FIG. 5) having predetermined intervals therebetween in the traveling direction of the work vehicle 1. Therefore, the final design topography 60 is understood as a plurality of divided final design surfaces 60_1, 60_2, and 60_3 divided by the plurality of points.

In the drawings, only a portion of the final design surface has reference numerals attached thereto and the reference numerals of the other portions of the final design surface are omitted. In FIG. 5, while the final design topography 60 has a shape that is flat and parallel to the horizontal direction, the shape of the final design topography 60 may be different.

In step S103, the controller 26 obtains the actual topography information. As illustrated in FIG. 5, the actual topography information indicates cross sections of an actual topography 50 positioned in the traveling direction of the work vehicle 1.

In FIG. 5, the vertical axis indicates the height of the topography. The horizontal axis indicates the distance from a reference position d0 in the traveling direction of the work vehicle 1. The reference position may be the current blade tip position P0 of the work vehicle 1. Specifically, the actual topography information includes the height of the actual topography 50 at a plurality of points in the traveling direction of the work vehicle 1. The plurality of points are aligned with a predetermined interval therebetween of, for example, 1 m (see "–d5" to "d10" in FIG. 5).

Therefore, the actual topography 50 is understood as a plurality of actual surfaces 50_1, 50_2, and 50_3 divided by the plurality of points. In the drawings, only a portion of the actual surfaces have reference numerals attached thereto and the reference numerals of the other portions of the actual surfaces are omitted.

For example, the controller 26 obtains position information which indicates the most recent locus of the blade tip position P0 as the actual topography information. Therefore, the position detection device 31 functions as an actual topography obtaining device for obtaining the actual topography information. By moving the blade tip position P0, the controller 26 updates the actual topography information to the most recent actual topography and saves the actual topography information in the storage device 28.

Alternatively, the controller 26 may calculate the position of the bottom surface of the crawler belt 16 from vehicle body position information and vehicle body dimension information, and may obtain the position information which indicates the locus of the bottom surface of the crawler belt 16 as the actual topography information. Alternatively, the actual topography information may be generated from survey data measured by a survey device outside of the work vehicle 1. Alternatively, the actual topography 50 may be imaged by a camera and the actual topography information may be generated from image data captured by the camera.

In step S104, the controller 26 obtains a target soil amount St. The target soil amount St may be a fixed value determined on the basis of the capacity of the blade 18, for example. Alternatively, the target soil amount St may be optionally set with an operation of the operator.

In step S105, the controller 26 obtains an excavation start position Ps. The controller 26 obtains the excavation start position Ps on the basis of an operation signal from the operating device 25. For example, the controller 26 may determine the blade tip position P0 at the point in time that a signal indicating an operation to lower the blade 18 is received from the operating device 252, as the excavation start position Ps. Alternatively, the excavation start position Ps may be saved beforehand in the storage device 28 and obtained from the storage device 28.

In step S106, a virtual design surface 70 is determined. The controller 26 determines the virtual design surface 70 as indicated, for example, in FIG. 5. The virtual design surface 70 is understood as a plurality of design surfaces (division unit surfaces) 70_1, 70_2, and 70_3 divided by the plurality of points. In the drawings, only a portion of the actual surfaces has reference numerals attached thereto and the reference numerals of the other portions of the actual surfaces are omitted.

When the actual topography 50 is positioned above the final design topography 60, the controller 26 determines the virtual design surface 70 to be positioned below the actual topography 50. However, a portion of the virtual design surface 70 may be positioned above the actual topography 50.

For example, the virtual design surface 70 extends linearly from the excavation start position Ps. The controller 26 determines the virtual design surface 70 on the basis of the target soil amount St and an estimated held soil amount S of the work implement 13. As illustrated in FIG. 5, the estimated held soil amount S is an estimated value of the soil amount held by the work implement 13 when the blade tip position P0 of the work implement 13 is moved along the virtual design surface 70. The controller 26 calculates the soil amount between the virtual design surface 70 and the actual topography 50 as the estimated held soil amount S.

The soil amount between the virtual design surface 70 and the actual topography 50 is calculated as an amount that corresponds to a cross-sectional area (area of shaded portions in FIG. 5) between the virtual design surface 70 and the actual topography 50. At this time, the size of the actual topography 50 in the width direction of the work vehicle 1 is not considered in the present embodiment. However, the soil amount may be calculated by considering the size of the actual topography 50 in the width direction of the work vehicle 1.

The controller 26 determines an inclination angle of the virtual design surface 70 so that the estimated held soil amount S matches the target soil amount St. However, the controller 26 determines the virtual design surface 70 so as not to go below the final design topography 60.

When the actual topography 50 is positioned below the final design topography 60, the controller 26 determines the virtual design surface 70 to be positioned above the actual topography 50. However, a portion of the virtual design surface 70 may be positioned below the actual topography 50. For example, the controller 26 determines the virtual design surface 70 so that the estimated held soil amount S is no greater than a predetermined soil amount threshold when the blade tip position P0 of the work implement 13 reaches a predetermined position in front of the work vehicle 1.

Alternatively, when the actual topography 50 is positioned below the final design topography 60, the controller 26 may determine the virtual design surface 70 to be positioned a predetermined distance above the actual topography 50. Alternatively, when the actual topography 50 is positioned below the final design topography 60, the controller 26 may determine a virtual design surface 70 that follows the actual topography 50.

In step S107, the work implement 13 is controlled so as to follow the virtual design surface 70. The controller 26 generates a command signal for the work implement 13 so as to move the blade tip position P0 of the work implement 13 along the virtual design surface 70 created in step S106. The generated command signal is input to the control valve 27. Consequently, the excavating work of the actual topography 50 is performed by moving the blade tip position P0 of the work implement 13 along the virtual design surface 70.

Figure 6:
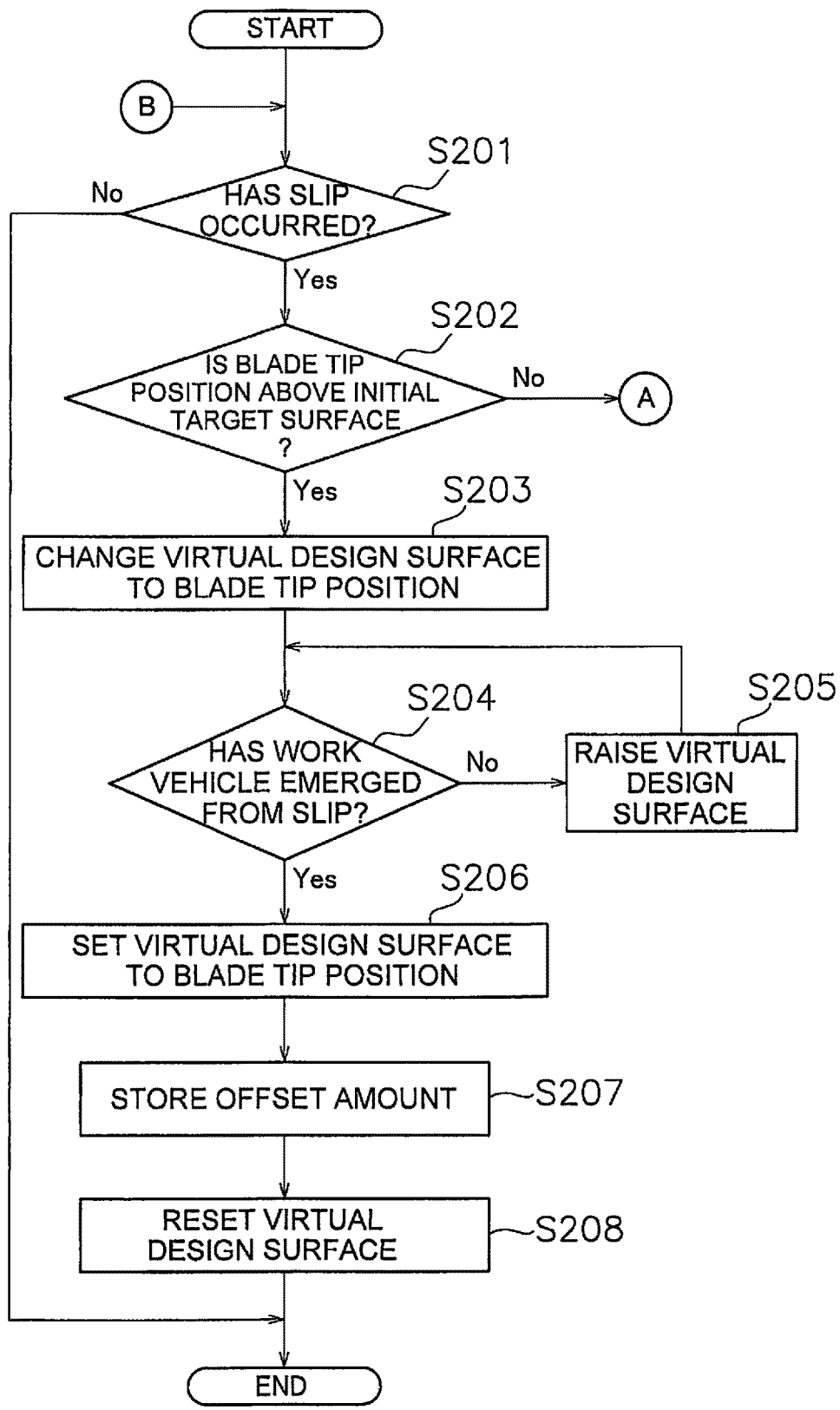
FIG. 6 is a flow chart illustrating automatic control processing of the work implement when slip has occurred.

Next, a control performed when slip of the travel device 12 occurs in the work vehicle 1 will be explained. In the control system 3 of the work vehicle 1 according to the present embodiment, when the occurrence of slip is detected, the controller 26 causes the work vehicle 1 to emerge from the slip by changing the abovementioned virtual design surface 70. FIG. 6 is a flow chart of a process executed by the controller 26 during the control when slip occurs.

In step S201, the controller 26 determines whether slip has occurred or not in the travel device 12. The controller 26 determines that slip has occurred on the basis of the actual vehicle speed and a theoretical vehicle speed of the work vehicle 1. The controller 26 calculates the actual vehicle speed from the vehicle body position information obtained from the GNSS receiver 32. The theoretical vehicle speed is an estimated value of the vehicle speed of the work vehicle 1. The controller 26 may calculate the theoretical vehicle speed from the rotation speed of the output shaft of the power transmission device 24. The controller 26 determines that slip has occurred when the ratio of the actual vehicle speed with respect to the theoretical vehicle speed (actual vehicle speed/theoretical vehicle speed) is equal to or less than a predetermined ratio threshold.

Alternatively, a load sensor for detecting the load of the blade 18 may be provided and the controller 26 may obtain the load of the blade 18 on the basis of a detection signal from the load sensor. The controller 26 may determine that slip has occurred when the load of the blade 18 is larger than a predetermined load threshold.

Alternatively, the controller 16 may determine that slip has occurred by using both the abovementioned ratio and the load of the blade 18. Alternatively, the controller 26 may determine that slip has occurred by using another means.

Figure 7:
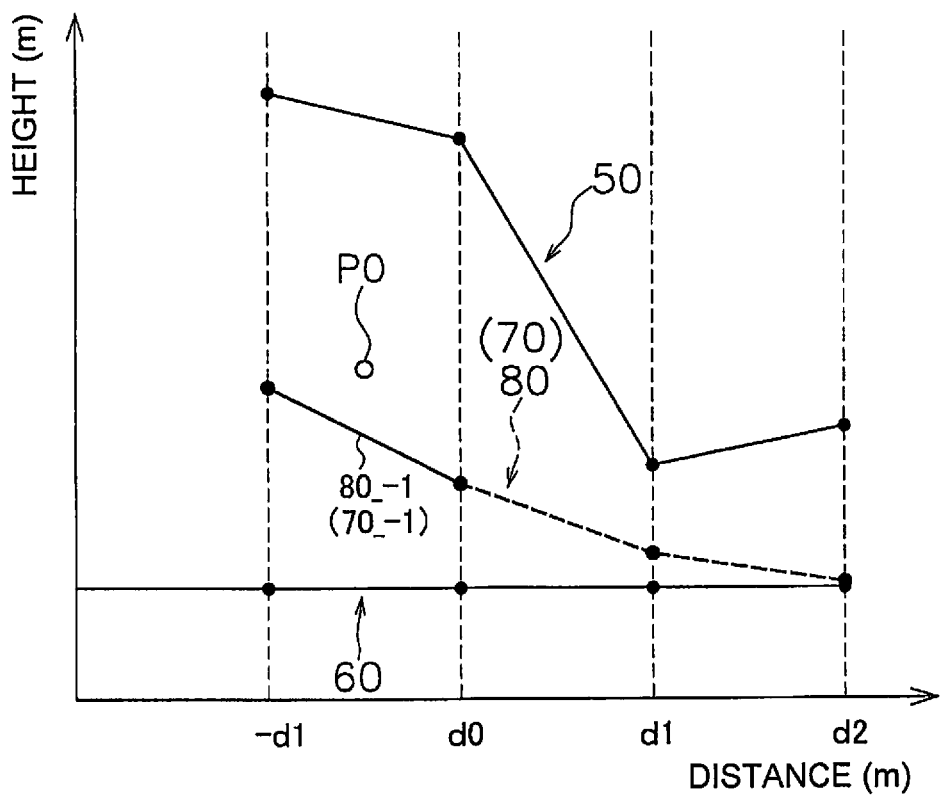
FIG. 7 illustrates the actual topography, the virtual design surface, and the blade tip position of the work implement when slip has occurred.

When it has been determined that slip has occurred, the process advances to step S202. FIG. 7 illustrates the actual topography, the virtual design surface 70, and the blade tip position P0 of the work implement 13 when slip has occurred. In step S202, the controller 26 determines whether the blade tip position P0 is above an initial target surface 80 when the slip has occurred. The initial target surface 80 is the virtual design surface 70 set before the occurrence of the slip. In FIG. 7, 80_−1 is the portion corresponding to the reference position d0 within the initial target surface 80. 70_−1 is the portion corresponding to the reference position d0 within the virtual design surface 70. In step S202, the controller 26 determines whether the blade tip position P0 is positioned above the initial target surface 80_−1.

The controller 26 moves the blade tip of the work implement 13 along the initial target surface 80_−1 before the occurrence of the slip. However, there is a time lag until the blade tip of the work implement 13 reaches the initial target surface 80_−1. As a result, as illustrated in FIG. 7, there is a possibility that slip has occurred before the blade tip of the work implement 13 has reached the initial target surface 80_−1. During the occurrence of the slip, when the blade tip position P0 is positioned above the initial target surface 80_−1, the processing advances to step S203.

Figure 8:
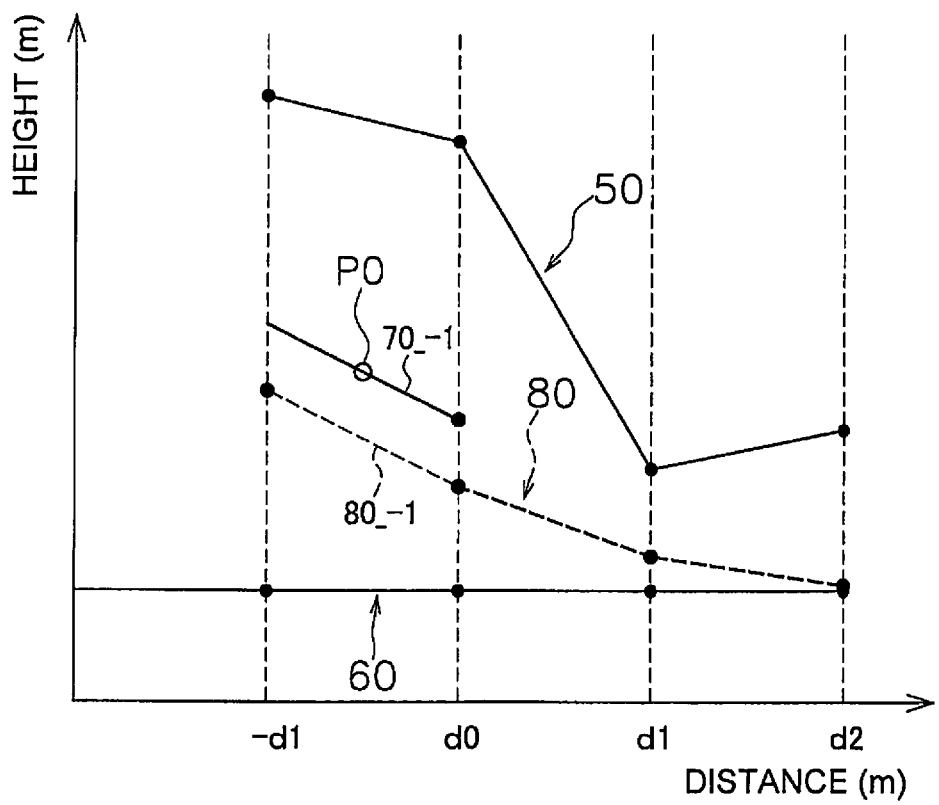
FIG. 8 illustrates a method for changing the virtual design surface while slip is occurring.

In step S203, the controller 26 changes the virtual design surface 70_−1 to the blade tip position P0 at the time that slip occurs. As illustrated in FIG. 8, the controller 26 changes the virtual design surface 70_−1 to a height that matches the blade tip position P0 at the time that slip occurs. The controller 26 changes the virtual design surface 70_−1 to the height that matches the blade tip position P0 instantaneously.

The controller 26 may change the virtual design surface 70_−1 to a position above the blade tip position P0 at the time that slip occurs. For example, the controller 26 may set the virtual design surface 70_−1 to a position at a height for which a predetermined distance is added to the height of the blade tip position P0 at the time that slip occurs.

Next in step S204, the controller 26 determines whether the work vehicle 1 has emerged from the slip. The controller 26 may determine whether the work vehicle 1 has emerged from the slip by comparing the abovementioned ratio between the actual vehicle speed and the theoretical vehicle speed and/or the load of the blade 18, with a predetermined threshold. Alternatively, the controller 26 may determine that the work vehicle 1 has emerged from the slip by using another means.

When it is determined in step S204 that the work vehicle 1 has not emerged from the slip, the process advances to step S205. That is, when it is determined that the slip continues even after changing the virtual design surface 70_−1 in step S203, the process advances to step S205.

Figure 9:
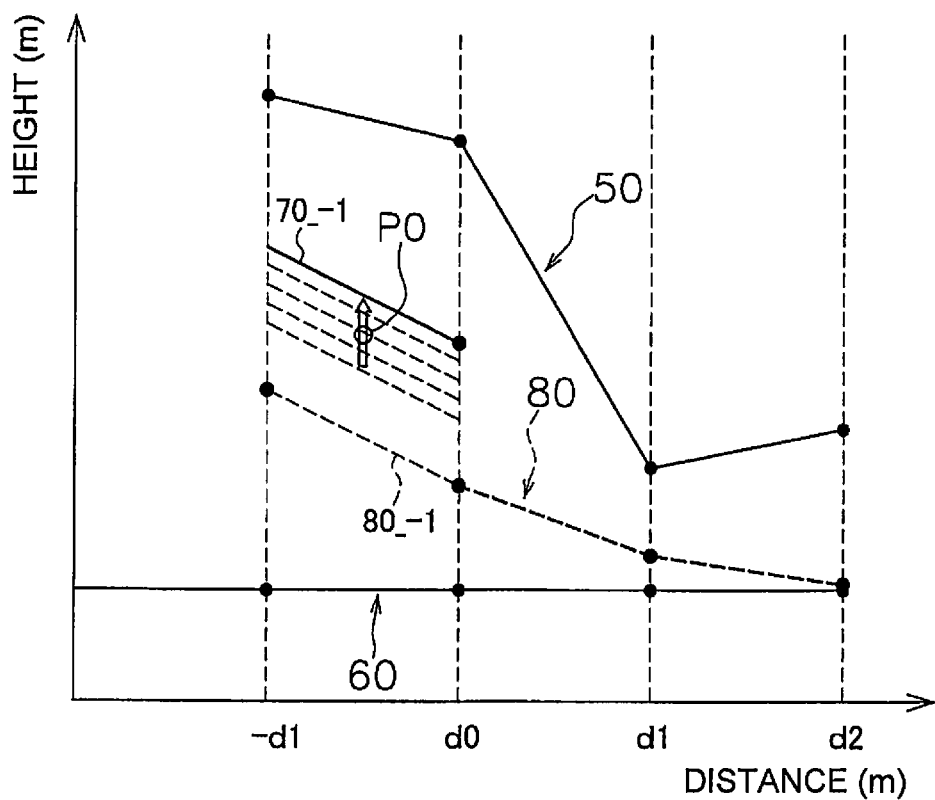
FIG. 9 illustrates a method for changing the virtual design surface while slip is occurring.

In step S205, the controller 26 further raises the virtual design surface 70_−1 at a predetermined speed as illustrated in FIG. 9 The controller 26 does not instantaneously change the virtual design surface 70_−1 as depicted in step S203, but gradually increases the virtual design surface 70_−1 at a fixed speed. For example, the controller 26 may raise the virtual design surface 70_−1 at the speed of 1 to 10 cm/s. Alternatively, the controller 26 may raise the virtual design surface 70_−1 at the speed of 10 to 20 cm/s. Alternatively, the controller 26 may raise the virtual design surface 70_−1 at an even higher speed. Alternatively, the speed of the raising of the virtual design surface 70_−1 may not be fixed and may be changed in response to the conditions.

Figure 10:
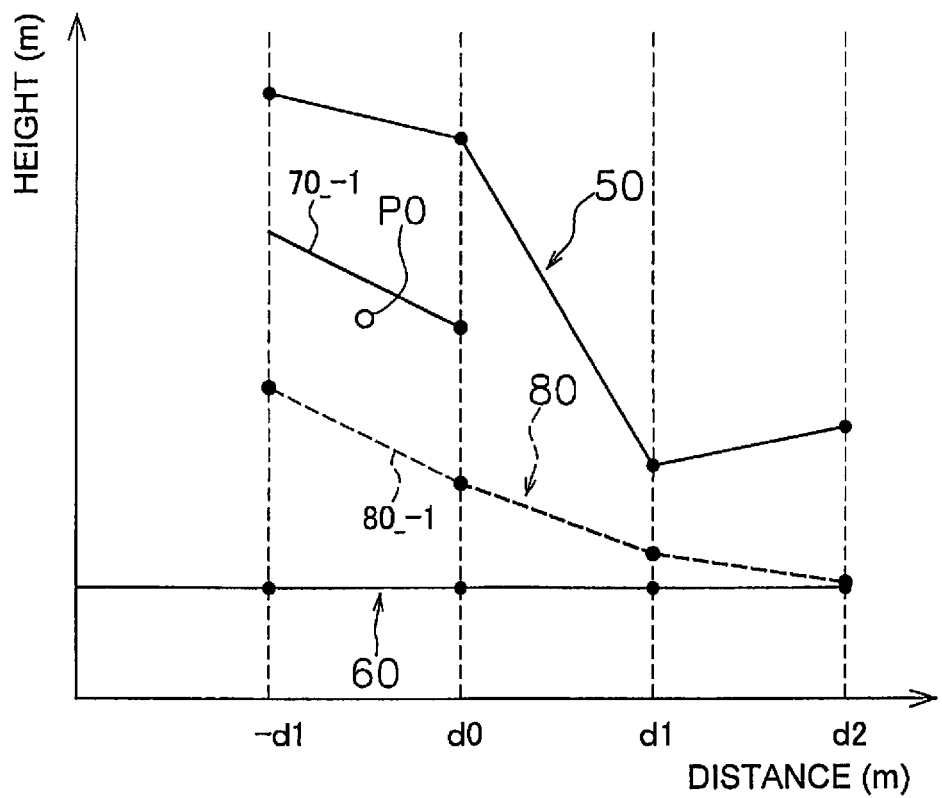
FIG. 10 illustrates the blade tip position when the work vehicle has emerged from the slip.

FIG. 10 illustrates the blade tip position P0 when the work vehicle 1 has emerged from the slip due to the change of the virtual design surface 70_−1 in step S205. In this state, the blade tip position P0 has not yet reached the changed virtual design surface 70_−1 and is positioned below the changed virtual design surface 70_−1. When it is determined that the work vehicle 1 has emerged from the slip, the process advances to step S206.

Figure 11:
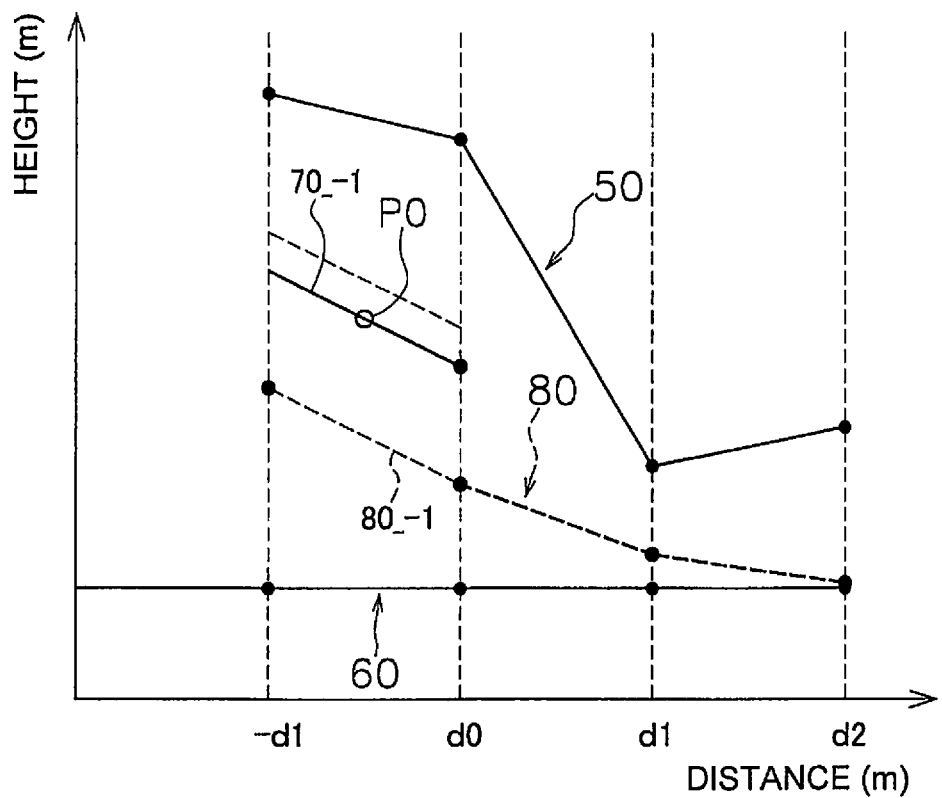
FIG. 11 illustrates a method for setting the virtual design surface after emerging from the slip.

In step S206, the virtual design surface 70_−1 is set to the blade tip position P0 when the work vehicle 1 emerged from the slip. As illustrated in FIG. 11, the controller 26 changes the virtual design surface 70_−1 to a height that matches the blade tip position P0 at the time that the work vehicle 1 emerged from the slip.

Figure 12:
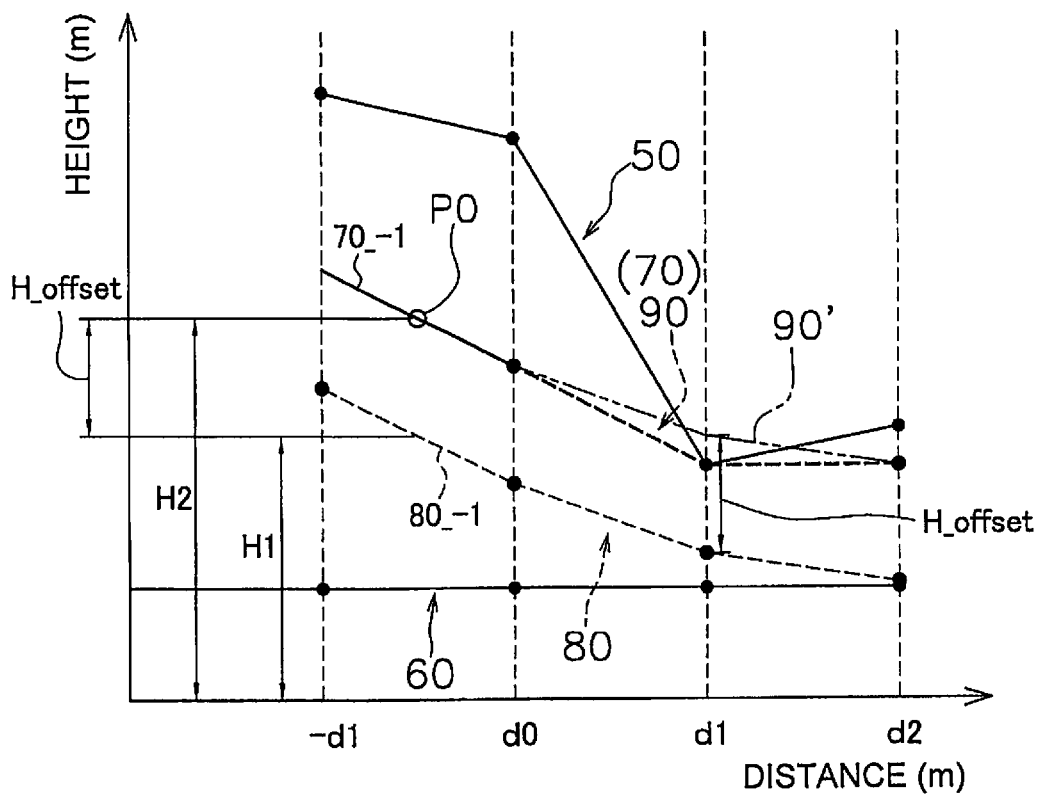
FIG. 12 illustrates a method for setting the virtual design surface after emerging from the slip.

In step S207, the controller 26 stores an offset amount. As illustrated in FIG. 12, an offset amount H_offset is the difference between a height H1 of the initial target surface 80_−1 and a height H2 of the blade tip position P0 at the point in time that the work vehicle 1 emerged from the slip.

In step S208, the controller 26 then resets the virtual design surface 70. As illustrated in FIG. 12, the controller 26 changes the virtual design surface 70 positioned in front of the blade tip position P0 on the basis of the offset amount H_offset. Specifically, the controller 26 sets a compensated target surface 90 in which the initial target surface 80 has been moved upward by the offset amount H_offset as the virtual design surface 70 after the work vehicle 1 has emerged from the slip.

However, the controller 26 generates the compensated target surface 90 so as not to go above the actual topography 50. As a result, as illustrated in FIG. 12, when an initial compensated target surface 90' for which the initial target surface 80 has been moved upward by the offset amount H_offset, does not go above the actual topography 50, the controller 26 sets the compensated target surface 90, which is corrected so as not to go above the actual topography 50, as the virtual design surface 70.

Specifically, in FIG. 12, the initial compensated target surface 90' at the interval d1 is positioned above the actual topography 50. As a result, the compensated target surface 90, which is corrected so that the height at the interval d1 matches the actual topography 50, is set as the virtual design surface 70.

Even if the work vehicle 1 emerges from the slip due to the change of the virtual design surface 70 in step S203, the controller 26, in step S206, sets the virtual design surface 70 to the blade tip position P0 when the work vehicle 1 emerged from the slip. In step S207, the controller 26 stores the difference between the height H1 of the initial target surface 80_−1 and the height H2 of the blade tip position P0 at the point in time that the work vehicle 1 emerged from the slip, as the offset amount H_offset. In step S208, the controller 26 then resets the virtual design surface 70 on the basis of the offset amount H_offset.

Figure 13:
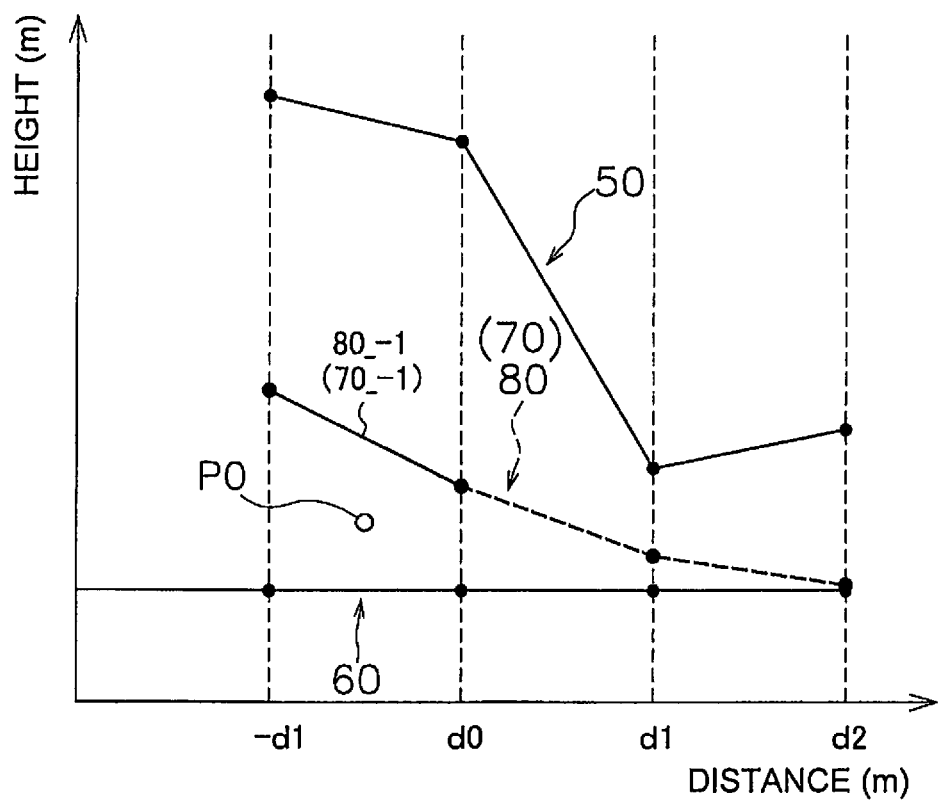
FIG. 13 illustrates the actual topography, the virtual design surface, and the blade tip position of the work implement when slip has occurred.
Figure 14:
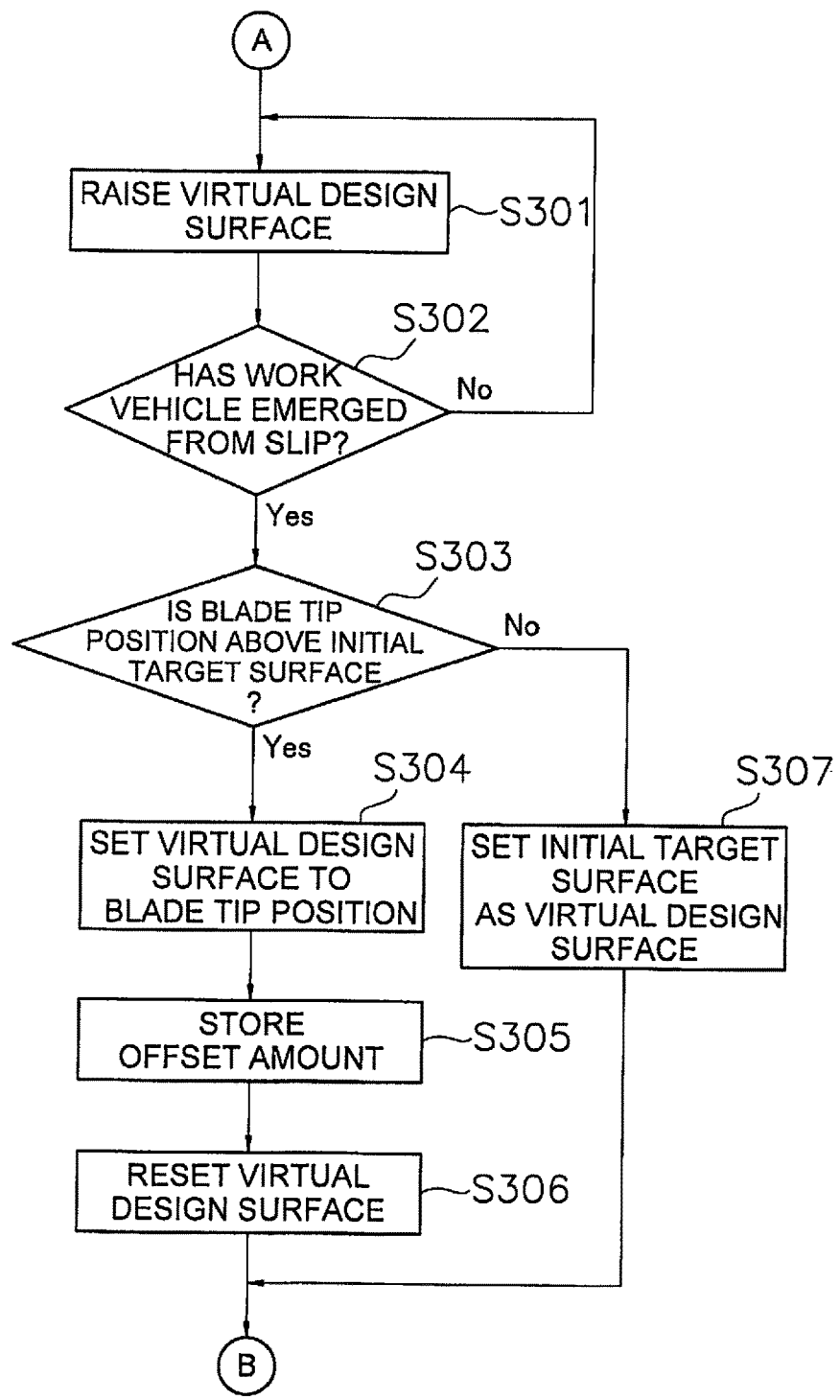
FIG. 14 is a flow chart illustrating automatic control processing of the work implement when slip has occurred.

As illustrated in FIG. 13, when the blade tip position P0 at the time that the slip occurred is positioned at the same height or below the initial target surface 80_−1, the processing advances from step S202 to step S301 in FIG. 14.

For example, after the blade tip position P0 has reached the initial target surface 80_-1, there is a possibility that slip may occur due to the blade tip position P0 being moved too far below the initial target surface 80_-1. In such a case, the virtual design surface 70 is changed with the processes illustrated in FIG. 14.

Figure 15:
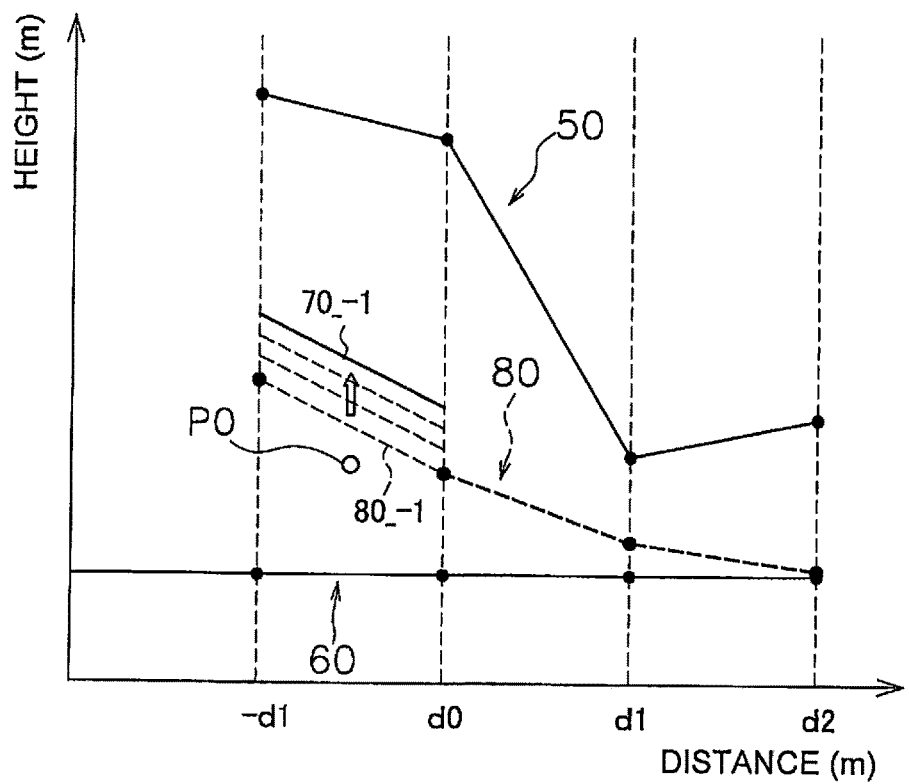
FIG. 15 illustrates a method for changing the virtual design surface while slip is occurring.

In step S301, the controller 26 raises the virtual design surface 70_-1 by a predetermined speed as illustrated in FIG. 15. This process is the same as the process performed in step S205. In step S302, the controller 26 determines whether the work vehicle 1 has emerged from the slip in the same way as in step S204. When it is determined that the work vehicle 1 has emerged from the slip, the process advances to step S303.

Figure 16:
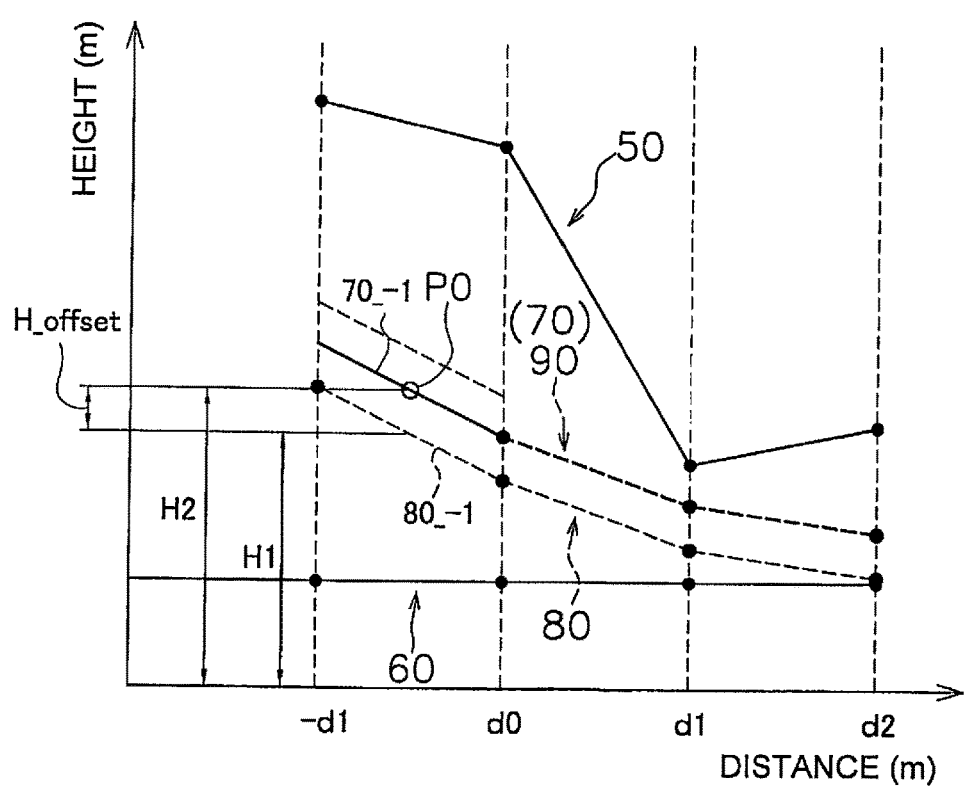
FIG. 16 illustrates a method for setting the virtual design surface after emerging from the slip.

In step S303, the controller 26 determines whether the blade tip position P0 at the point in time that the work vehicle 1 emerged from the slip is positioned above the initial target surface 80_-1. As illustrated in FIG. 16, when the blade tip position P0 at the point in time that the work vehicle 1 emerged from the slip is positioned above the initial target surface 80_-1, the processing advances to step S304.

In step S304, the controller 26 sets the virtual design surface 70_-1 to the blade tip position P0 when the work vehicle 1 emerged from the slip in the same way as in step S206. As illustrated in FIG. 16, the controller 26 changes the virtual design surface 70_-1 to a height that matches the blade tip position P0 at the time that the work vehicle 1 emerged from the slip. Additionally, in step S305, the controller 26 stores the difference between the height H1 of the initial target surface 80_-1 and the height H2 of the blade tip position P0 at the point in time that the work vehicle 1 emerged from the slip, as the offset amount H_offset in the same way as in step S207. In step S306, the controller 26 then resets the compensated target surface 90 in which the initial target surface 80 has been moved upward by the offset amount H_offset as the virtual design surface 70 after the work vehicle 1 has emerged from the slip in the same way as in step S208. The process then returns to step S201.

Figure 17:
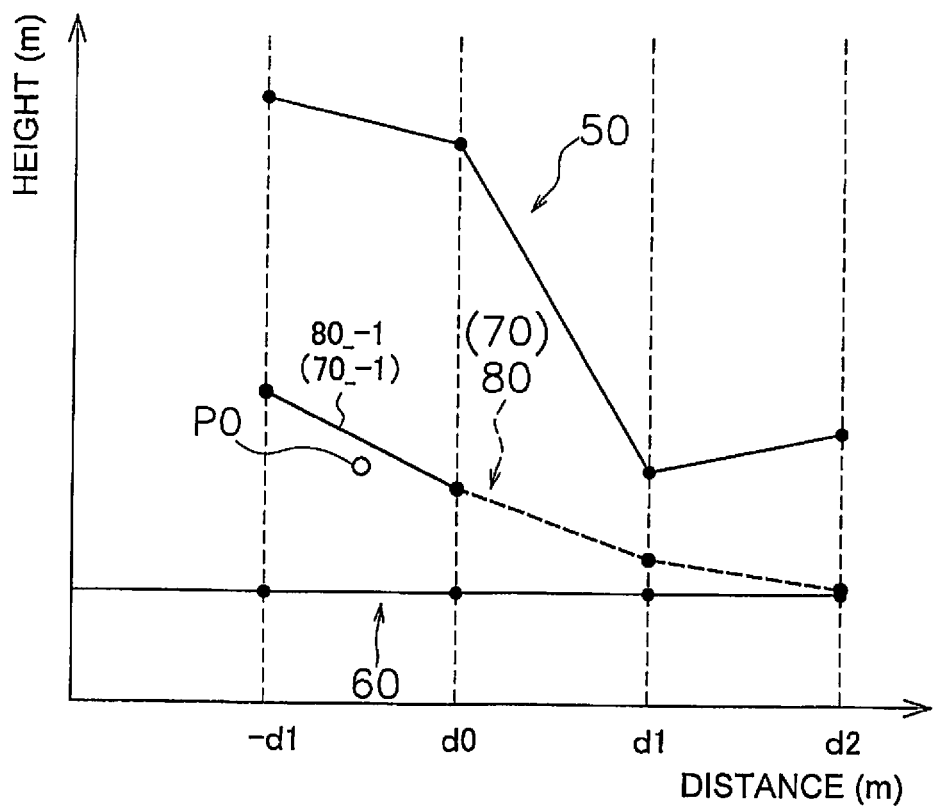
FIG. 17 illustrates a method for setting the virtual design surface after emerging from the slip.

As illustrated in FIG. 17, when the blade tip position P0 at the point in time that the work vehicle 1 emerged from the slip is positioned below the initial target surface 80_-1, the processing advances from step S303 to step S307. In step S307, the initial target surface 80 is set as the virtual design surface 70 after the work vehicle 1 emerged from the slip. The process then returns to step S201.

In the control system 3 of the work vehicle 1 according to the present embodiment discussed above, the virtual design surface 70 is changed so as to be raised when the blade tip position P0 is positioned below the initial target surface 80 when the slip of the work vehicle 1 occurred. The work implement 13 is then controlled so as to move along the changed virtual design surface 70. Therefore, the blade tip of the work implement 13 can be raised with respect to the actual topography 50. As a result, the front of the travel device 12 can be more quickly brought into contact with the ground in comparison to when the blade tip is raised relative to the work vehicle 1. As a result, the work vehicle 1 can emerge from the slip more quickly.

Additionally, the blade tip position P0 of the work implement 13 is changed from the position when the slip occurred because the blade tip of the work implement 13 is raised with respect to the actual topography 50. As a result, repetition of the slip can be suppressed.

Although the embodiment of the present invention has been described so far, the present invention is not limited to the above embodiment and various modifications may be made within the scope of the invention.

The work vehicle is not limited to a bulldozer, and may be another type of work vehicle such as a wheel loader or the like.

The work vehicle 1 may be a vehicle that can be remotely operated. In this case, a portion of the control system 3 may be disposed outside of the work vehicle 1. For example, the controller 26 may be disposed outside the work vehicle 1. The controller 26 may be disposed inside a control center separated from the work site.

Figure 18:
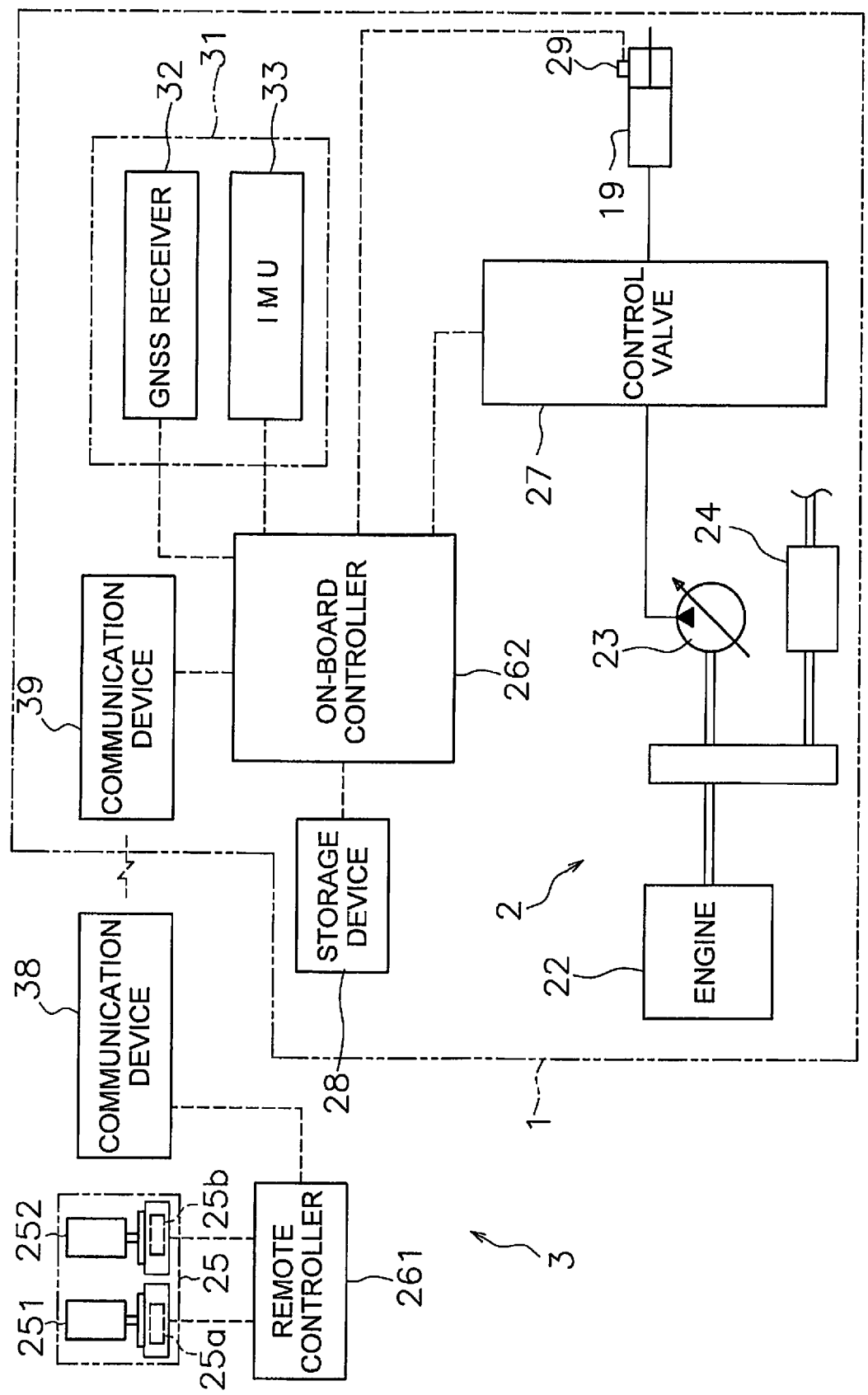
FIG. 18 is a block diagram of a configuration of the control system according to a modified example.

The controller 26 may have a plurality of controllers 26 separate from each other. For example as illustrated in FIG. 18, the controller 26 may include a remote controller 261 disposed outside of the work vehicle 1 and an on-board controller 262 mounted on the work vehicle 1. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262. For example, the processing for determining the virtual design surface 70 may be performed by the remote controller 261, and the process for outputting the command signal for the work implement 13 may be performed by the on-board controller 262.

The operating devices 25 may be disposed outside of the work vehicle 1. In this case, the operating cabin may be omitted from the work vehicle 1. Alternatively, the operating devices 25 may be omitted from the work vehicle 1. The work vehicle 1 may be operated with only the automatic control by the controller 26 without operations by the operating devices.

Figure 19:
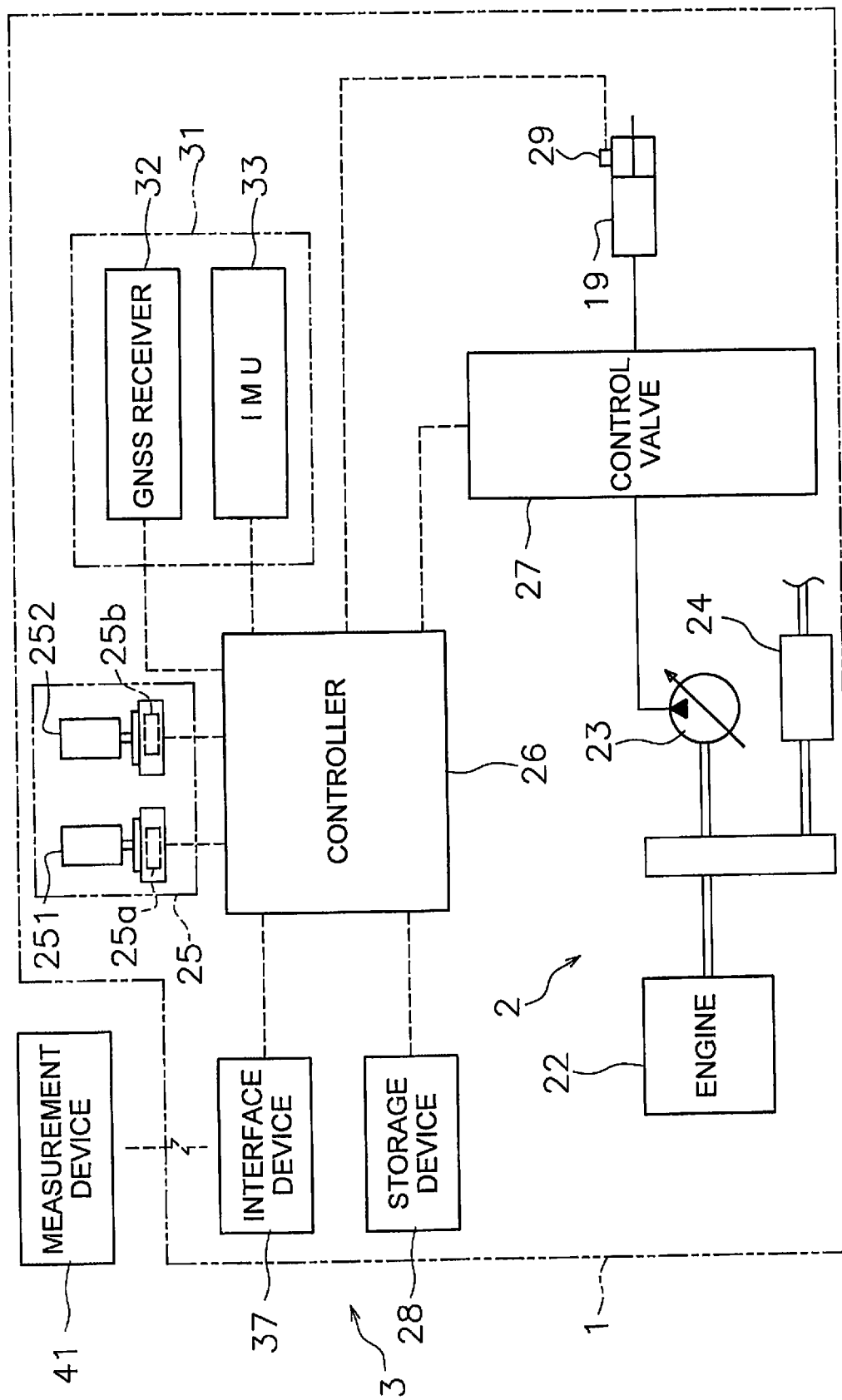
FIG. 19 is a block diagram of a configuration of the control system according to another modified example.
Figure 20A:
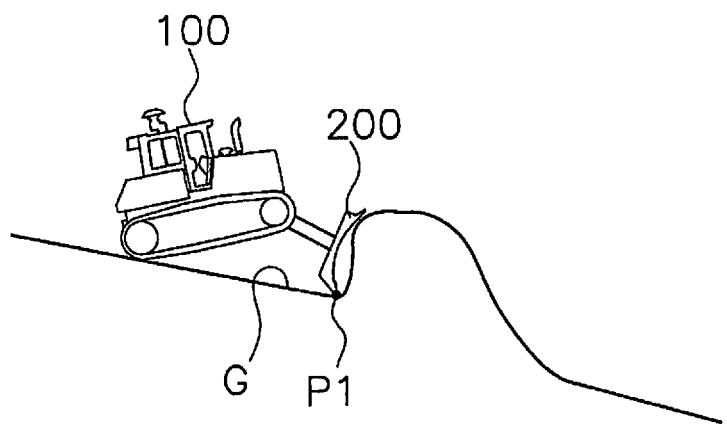
FIGS. 20A-20C illustrate excavation according to the prior art.
Figure 20B:
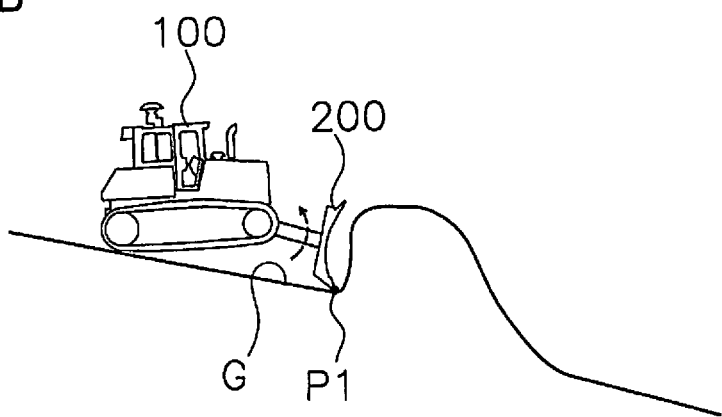
Figure 20C:
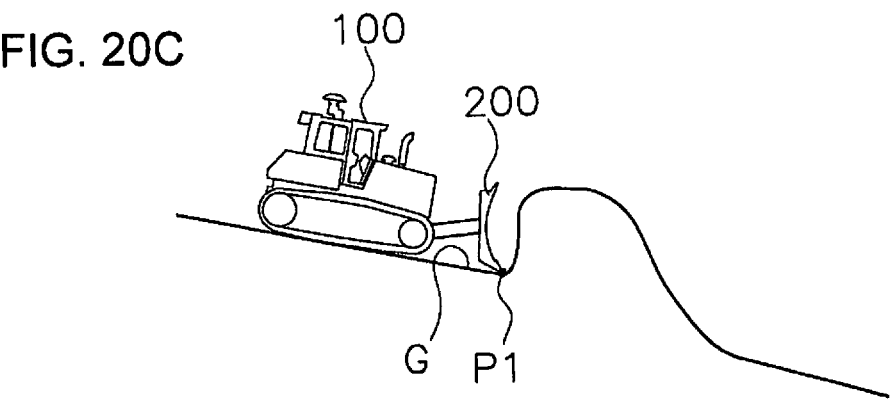

The actual topography obtaining device is not limited to the abovementioned position detection device 31 and may be another device. For example, as illustrated in FIG. 19, the actual topography obtaining device may be an interface device 37 that accepts information from external devices. The interface device 37 may wirelessly receive actual topography information measured by an external measurement device 41. Alternatively, the interface device 37 may be a recording medium reading device and may accept the actual topography information measured by the external measurement device 41 via a recording medium.

The method for setting the virtual design surface 70 is not limited to the method of the above embodiment and may be changed. The controller 26 may determine the virtual design surface 70 to be positioned a predetermined distance below the actual topography 50. The controller may determine the predetermined distance on the basis of the estimated held soil amount. Alternatively, the controller 26 may determine the virtual design surface 70 regardless of the estimated held soil amount.

The same control may be performed when the blade tip position P0 when the slip occurs is positioned above the initial target surface 80_-1 even when the blade tip position P0 when the slip occurs is positioned at the same height as or below the initial target surface 80_-1. That is, the process in step S203 may be omitted.

In such a case, when the blade tip position P0 when the slip occurs is positioned above initial target surface 80_-1, the virtual design surface 70_-1 may be raised at the predetermined speed from the blade tip position P0 when the slip occurred.

According to the present invention, the work vehicle can be made to emerge quickly from the slip during excavation and the repetition of the slip can be suppressed.

What is claimed is:

1. A control system for a work vehicle including a work implement, the control system comprising:
a controller programmed to
receive actual topography information indicating an actual topography of a work target,
determine a design surface positioned below the actual topography,
generate a command signal to move the work implement along the design surface,
determine if slip of the work vehicle has occurred,
determine whether a blade tip of the work implement is positioned below an initial target surface upon determining slip of the work vehicle has occurred, and
raise the design surface upon determining the blade tip of the work implement when the slip occurred is positioned below the initial target surface, the initial target surface being the design surface before the occurrence of the slip.

2. The control system for a work vehicle according to claim 1, wherein
the controller is further programmed to raise the design surface at a predetermined speed.

3. The control system for a work vehicle according to claim 1, wherein
the controller is further programmed to set the design surface to a blade tip position of the work implement at a point in time that the work vehicle emerged from the slip upon determining that the work vehicle has emerged from the slip.

4. The control system for a work vehicle according to claim 3, wherein
the controller is further programmed set the design surface to not go above the actual topography.

5. The control system for a work vehicle according to claim 3, wherein
the controller is further programmed to
store as an offset amount, a difference between
a height of the initial target surface and
a height of the blade tip position of the work implement at the point in time that the work vehicle emerged from the slip, and
set a compensated target surface in which the initial target surface is moved upward by the offset amount, as the design surface after the work vehicle has emerged from the slip.

6. The control system for a work vehicle according to claim 5, wherein
the controller is further programmed to generate the compensated target surface to not go above the actual topography.

7. The control system for a work vehicle according to claim 1, wherein
the controller further is programmed to
set the design surface to the blade tip position of the work implement at the point in time that the work vehicle emerged from the slip when the blade tip position of the work implement at the time that the work vehicle emerged from the slip is positioned above the initial target surface, and
set the initial target surface as the design surface after the work vehicle emerged from the slip, when the blade tip position of the work implement at the point in time that the work vehicle emerged from the slip is positioned below the initial target surface.

8. A control method for a work vehicle including a work implement, the method comprising:
receiving actual topography information indicating an actual topography of a work target;
determining a design surface positioned below the actual topography;
generating a command signal to move the work implement along the design surface;
determining if slip of the work vehicle has occurred;
determining whether a blade tip of the work implement is positioned below an initial target surface upon determining slip of the work vehicle has occurred; and
raising the design surface upon determining the blade tip of the work implement when the slip occurred is positioned below the initial target surface, the initial target surface being the design surface before the occurrence of the slip.

9. The control method for a work vehicle according to claim 8, the method further comprising:
raising the design surface at a predetermined speed.

10. The control method for a work vehicle according to claim 8, further comprising
setting the design surface to a blade tip position of the work implement at a point in time that the work vehicle emerged from the slip upon determining that the work vehicle has emerged from the slip.

11. The control method for a work vehicle according to claim 10, further comprising:
setting the design surface not to go above the actual topography when the design surface is set to the blade tip position of the work implement at the point in time that the work vehicle emerged from the slip.

12. The control method for a work vehicle according to claim 10, further comprising:
storing as an offset amount, a difference between
a height of the initial target surface and
a height of the blade tip position of the work implement at the point in time that the work vehicle emerged from the slip; and
setting a compensated target surface in which the initial target surface is moved upward by the offset amount, as the design surface after the work vehicle has emerged from the slip.

13. The control method for a work vehicle according to claim 12, wherein
the compensated target surface is generated to not go above the actual topography.

14. The control method for a work vehicle according to claim 8, wherein
the design surface is set to the blade tip position of the work implement at the point in time that the work vehicle emerged from the slip when the blade tip position of the work implement at the time that the work vehicle emerged from the slip is positioned above the initial target surface, and
the initial target surface is set as the design surface after the work vehicle emerged from the slip, when the blade tip position of the work implement at the point in time that the work vehicle emerged from the slip is positioned below the initial target surface.

15. A work vehicle comprising:
a work implement; and
a controller configured to move the work implement along a design surface positioned below an actual topography of a work target,
upon determining a blade tip of the work implement is positioned below an initial target surface upon determining slip of the work vehicle has occurred, the design surface is raised, the initial target surface being the design surface before the occurrence of the slip.

16. The work vehicle according to claim 15, wherein the design surface is raised at a predetermined speed.

17. The work vehicle according to claim 15, wherein the design surface is set to a blade tip position of the work implement at a point in time that the work vehicle emerged from the slip upon determining that the work vehicle has emerged from the slip.

18. The work vehicle according to claim 17, wherein a difference is stored as an offset amount, the difference being between
- a height of the initial target surface and
- a height of the blade tip position of the work implement at the point in time that the work vehicle emerged from the slip, and a compensated target surface in which the initial target surface is moved upward by the offset amount, is set as the design surface after the work vehicle as emerged from the slip.

19. The work vehicle according to claim 18, wherein the compensated target surface is generated to not go above the actual topography.

20. The work vehicle according to claim 15, wherein
the design surface is set to the blade tip position of the work implement at the point in time that the work vehicle emerged from the slip when the blade tip position of the work implement at the time that the work vehicle emerged from the slip is positioned above the initial target surface, and the initial target surface is set as the design surface after the work vehicle emerged from the slip, when the blade tip position of the work implement at the point in time that the work vehicle emerged from the slip is positioned below the initial target surface.

* * * * *